(12) United States Patent
Wang et al.

(10) Patent No.: US 8,070,182 B2
(45) Date of Patent: Dec. 6, 2011

(54) HAND TRUCK HAVING ARRANGEMENT FOR MOUNTING ON A CARRIER OF BICYCLE AFTER HANDLES RETRACTING

(76) Inventors: Jui-Chia Wang, Taichung (TW); Tsui-Ling Su, Kaohsiung (TW)

( * ) Notice: Subject to any disclaimer, the term of this patent is extended or adjusted under 35 U.S.C. 154(b) by 335 days.

(21) Appl. No.: 12/497,555

(22) Filed: Jul. 3, 2009

(65) Prior Publication Data

US 2010/0007107 A1    Jan. 14, 2010

(30) Foreign Application Priority Data

Jul. 10, 2008   (TW) ................................ 97212319 U

(51) Int. Cl.
*B62B 3/00*       (2006.01)
*B62B 5/00*       (2006.01)
(52) U.S. Cl. ...................... 280/655; 280/47.26; 280/204
(58) Field of Classification Search .................. 280/638, 280/35, 37, 655, 655.1, 87.05, 47.131, 47.16–47.2, 280/47.23, 47.24, 47.26, 47.315, 47.371, 280/204
See application file for complete search history.

(56) References Cited

U.S. PATENT DOCUMENTS

| | | | | |
|---|---|---|---|---|
| 3,877,723 A * | 4/1975 | Fahey et al. | ..................... | 280/204 |
| 4,917,401 A * | 4/1990 | Iwaki | ............................. | 280/655 |
| 5,374,073 A * | 12/1994 | Hung-Hsin | ..................... | 280/30 |
| 5,470,088 A * | 11/1995 | Adams | ........................... | 280/204 |
| 5,482,304 A * | 1/1996 | Smith | ........................... | 280/204 |
| 5,590,897 A * | 1/1997 | Tsai | ............................. | 280/655 |
| 5,797,617 A * | 8/1998 | Lin | ............................... | 280/655 |
| 5,816,349 A * | 10/1998 | Hankins | .......................... | 180/11 |
| 5,951,037 A * | 9/1999 | Hsieh et al. | ................... | 280/655 |
| 6,012,729 A * | 1/2000 | Lin | ............................ | 280/47.18 |
| 6,149,168 A * | 11/2000 | Pauser et al. | ............. | 280/47.371 |
| 6,554,307 B1 * | 4/2003 | Ockenden | ...................... | 280/204 |
| 6,561,395 B2 * | 5/2003 | Lim et al. | ....................... | 224/261 |
| 6,688,636 B2 * | 2/2004 | Han | ............................. | 280/655 |
| 6,923,466 B2 * | 8/2005 | Tsai | ............................. | 280/646 |
| 6,976,690 B2 * | 12/2005 | Freeman | ....................... | 280/204 |
| 7,392,992 B2 * | 7/2008 | Stone et al. | .............. | 280/33.992 |
| 7,614,628 B2 * | 11/2009 | O'Connor | ........................ | 280/37 |
| 7,766,358 B1 * | 8/2010 | Phillips | .......................... | 280/204 |
| 2004/0069583 A1 * | 4/2004 | Tamura | ........................ | 190/18 A |
| 2006/0261564 A1 * | 11/2006 | Chuang | ..................... | 280/47.27 |
| 2009/0121456 A1 * | 5/2009 | Li | ............................... | 280/655.1 |

* cited by examiner

*Primary Examiner* — J. Allen Shriver, II
*Assistant Examiner* — Jacob Meyer

(57) ABSTRACT

A hand truck includes handles; a ledge comprising a cavity; a fastening device comprising a quick release and a clamp; and a locking device comprising a hollow first section including an opening on either side, a hollow second section releasably put on the first section, the second section including an opening on either side, the openings being in registration to each other, a block member in the first section and including a transverse channel aligned with the openings and the cavity, a sliding lock pin in the cavity, the openings, and the channel to lock the first and second sections, the lock pin having a projection in the channel, a depressible shuttle member in the first section and including a hook partially disposed in the block member, and an inclined slot in the hook with the projection disposed therein, and an actuation rod releasably secured to the shuttle member.

3 Claims, 7 Drawing Sheets

HAND TRUCK HAVING ARRANGEMENT FOR MOUNTING ON A CARRIER OF BICYCLE AFTER HANDLES RETRACTING

BACKGROUND OF THE INVENTION

1. Field of Invention

The invention relates to hand trucks and more particularly to such a hand truck having an arrangement for mounting on a carrier of a bicycle after retracting its handles.

2. Description of Related Art

A conventional hand truck comprises a small ledge adapted to set objects thereon, the ledge being flat against the floor when the hand truck is upright, two wheels at the base, and two handles extending upward from wheel mounts. The handles can be fixed, telescopic, or telescopic and pivotal one. A hand truck is designed to easily move a relatively heavy load.

Taiwanese Utility Model Patent Nos. 419,974, 492,441, 413,189, 335,783, and 299,733 each discloses a hand truck having two telescopic handles.

However, portability of the conventional hand trucks even after retracting is still not convenient. Thus, continuing improvements in the exploitation of hand truck are constantly being sought.

SUMMARY OF THE INVENTION

It is therefore one object of the invention to provide a hand truck having an arrangement for mounting on a carrier of a bicycle after retracting its handles.

The above and other objects, features and advantages of the invention will become apparent from the following detailed description taken with the accompanying drawings.

DETAILED DESCRIPTION OF THE INVENTION

Figure 1:
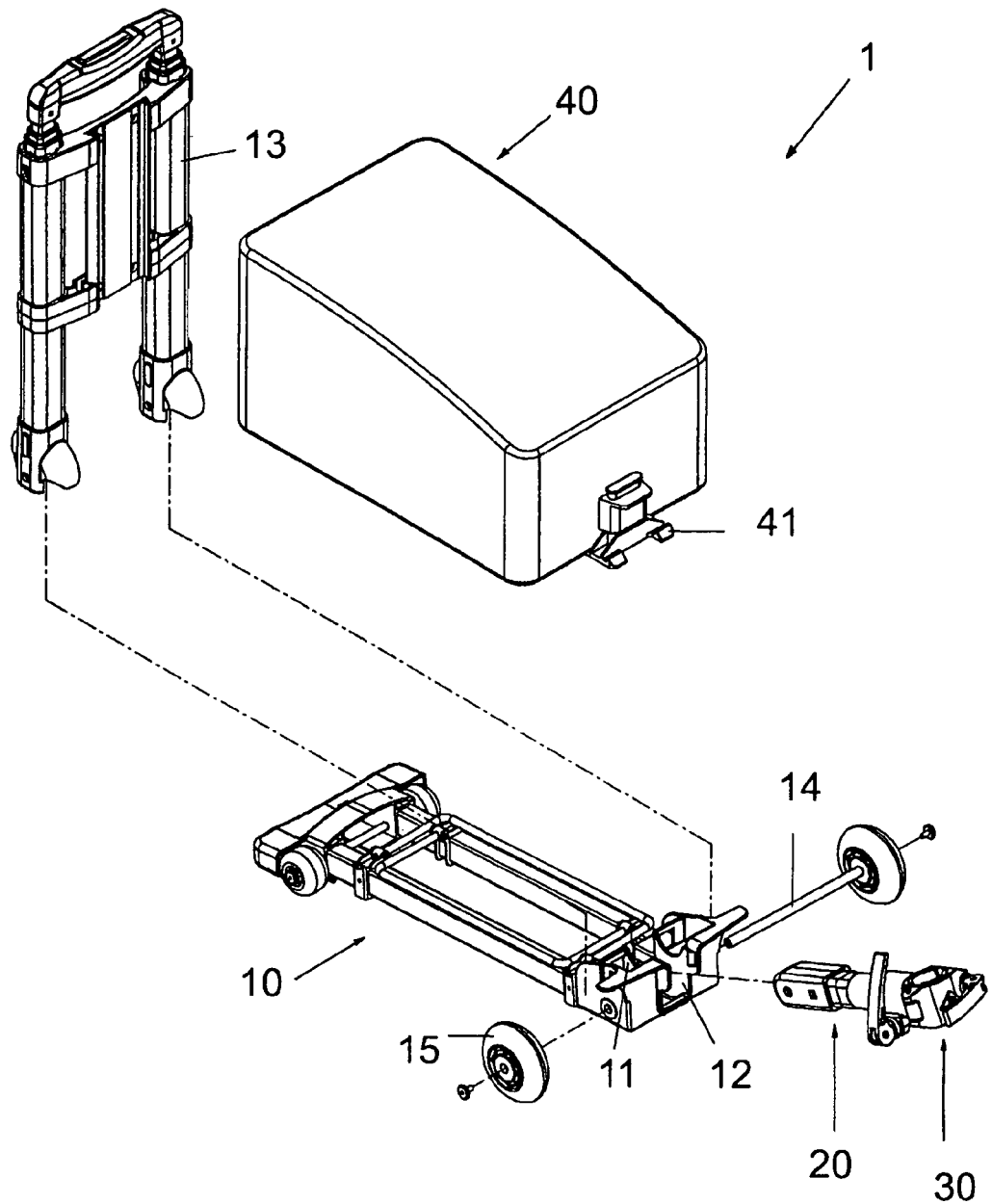
FIG. 1 is an exploded perspective view of a preferred embodiment of hand truck according to the invention.
Figure 2:
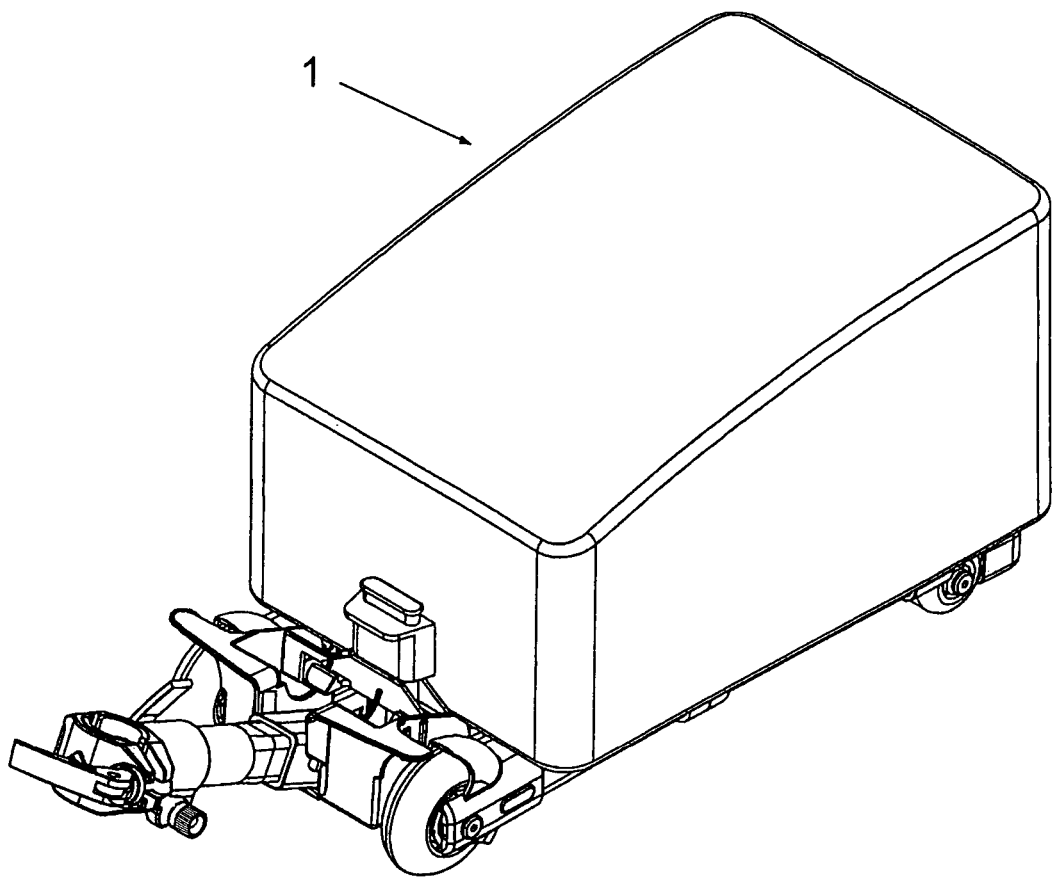
FIG. 2 is a perspective view of the assembled hand truck of FIG. 1.
Figure 3:
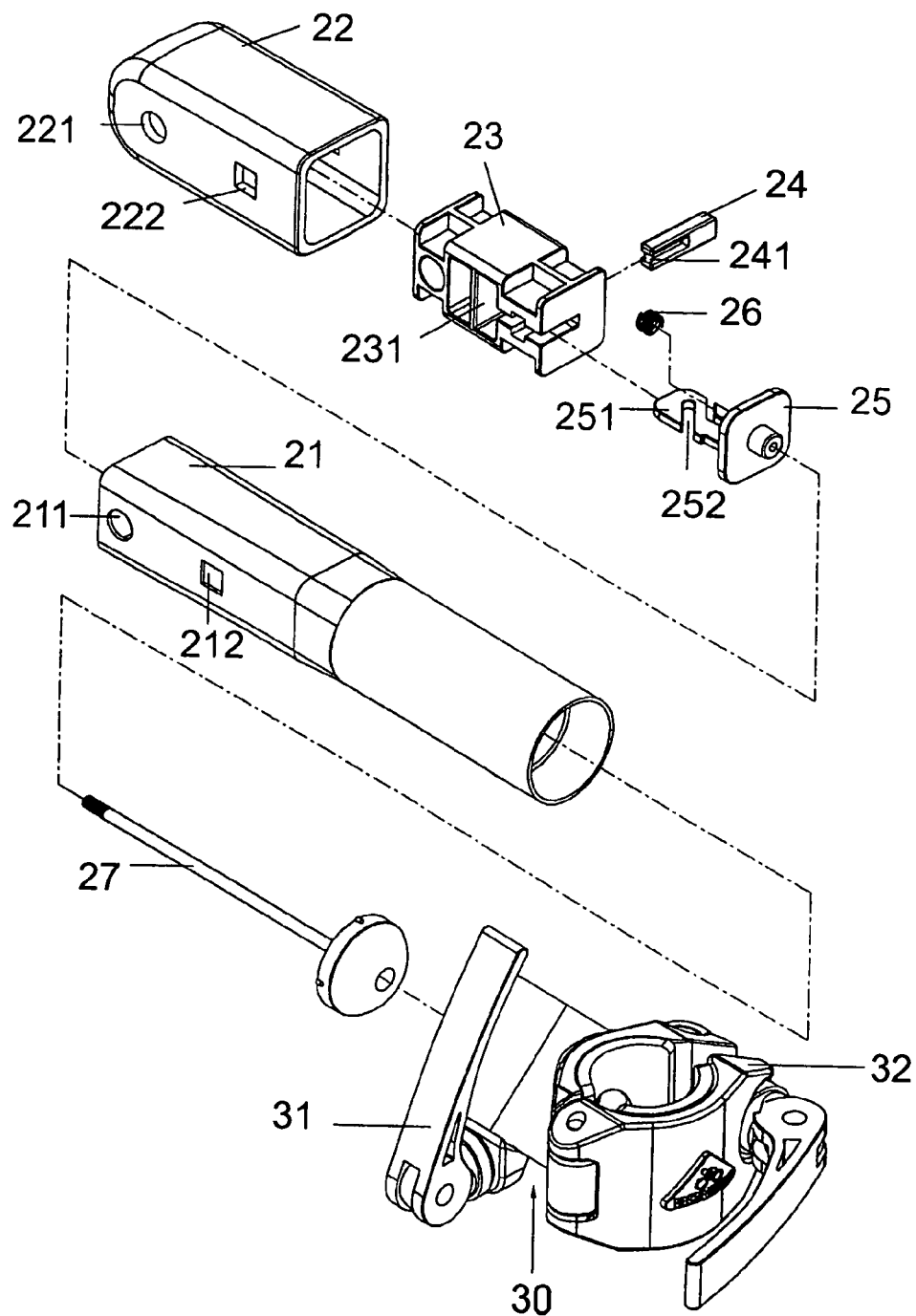
FIG. 3 is an exploded perspective view of the locking device and the fastening device of FIG. 1.
Figure 4:
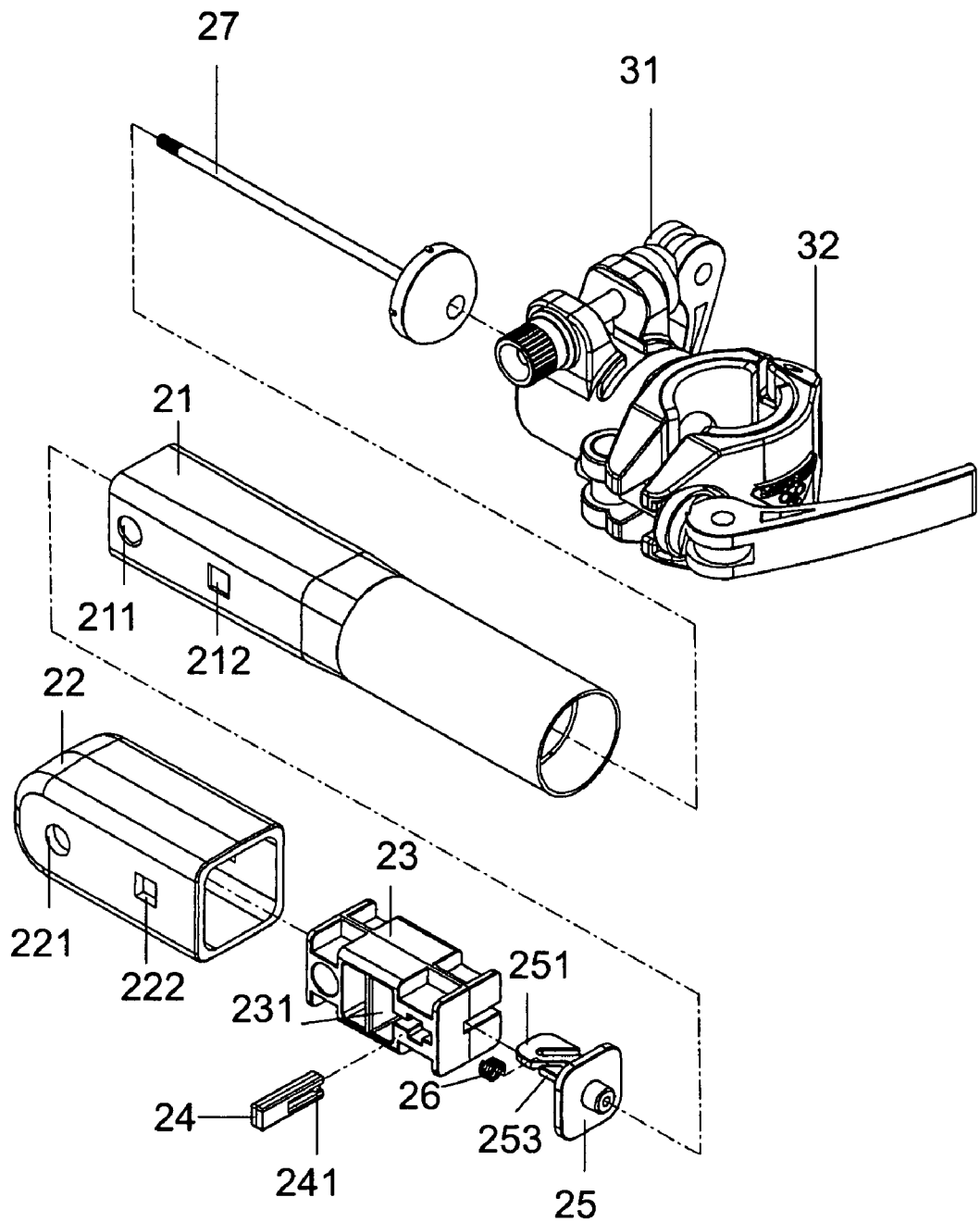
FIG. 4 is another exploded perspective view of the locking device and the fastening device of FIG. 1.
Figure 5:
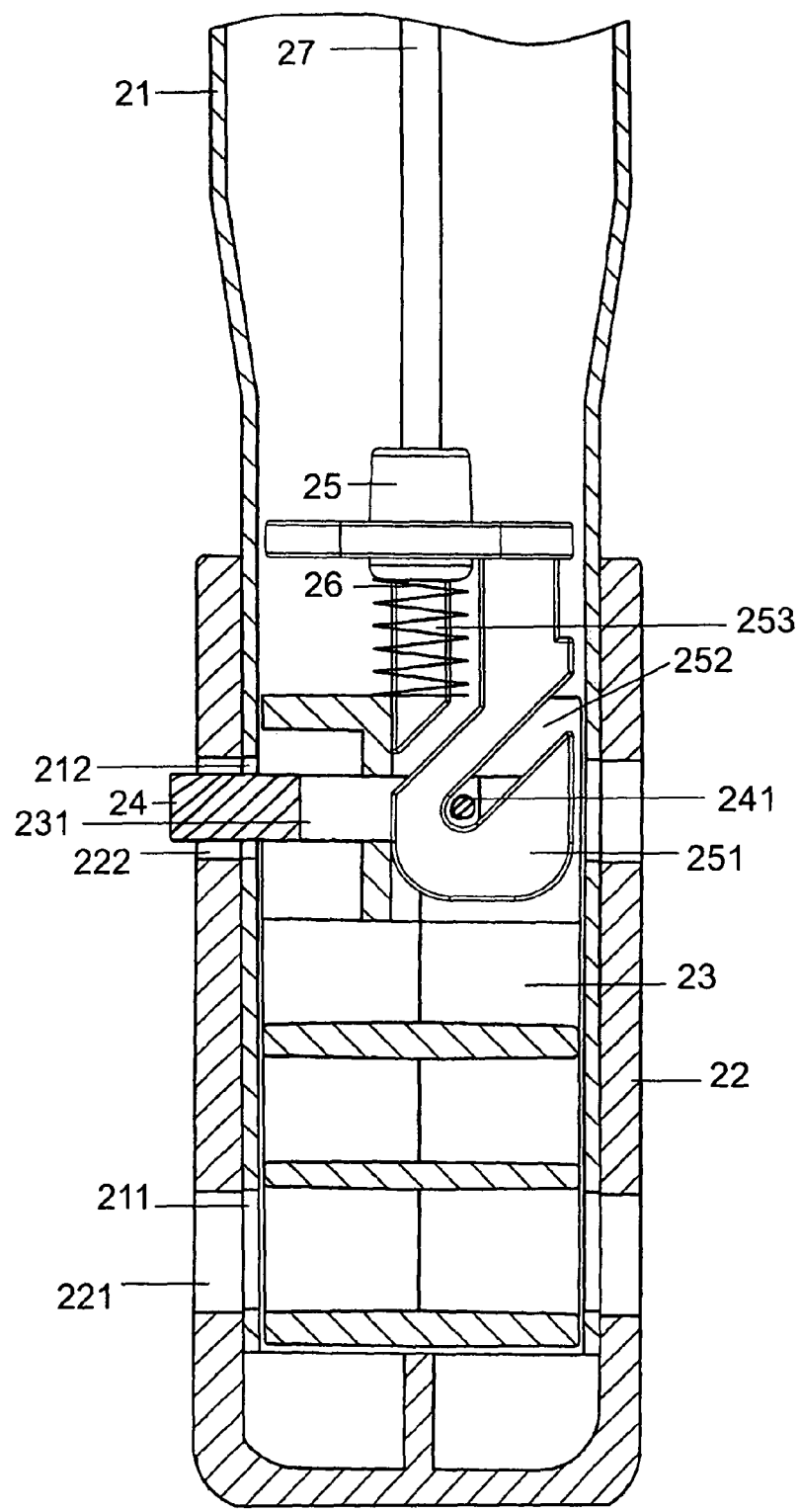
FIGS. 5 and 6 are sectional views showing operations for unlocking the locking device respectively.
Figure 6:
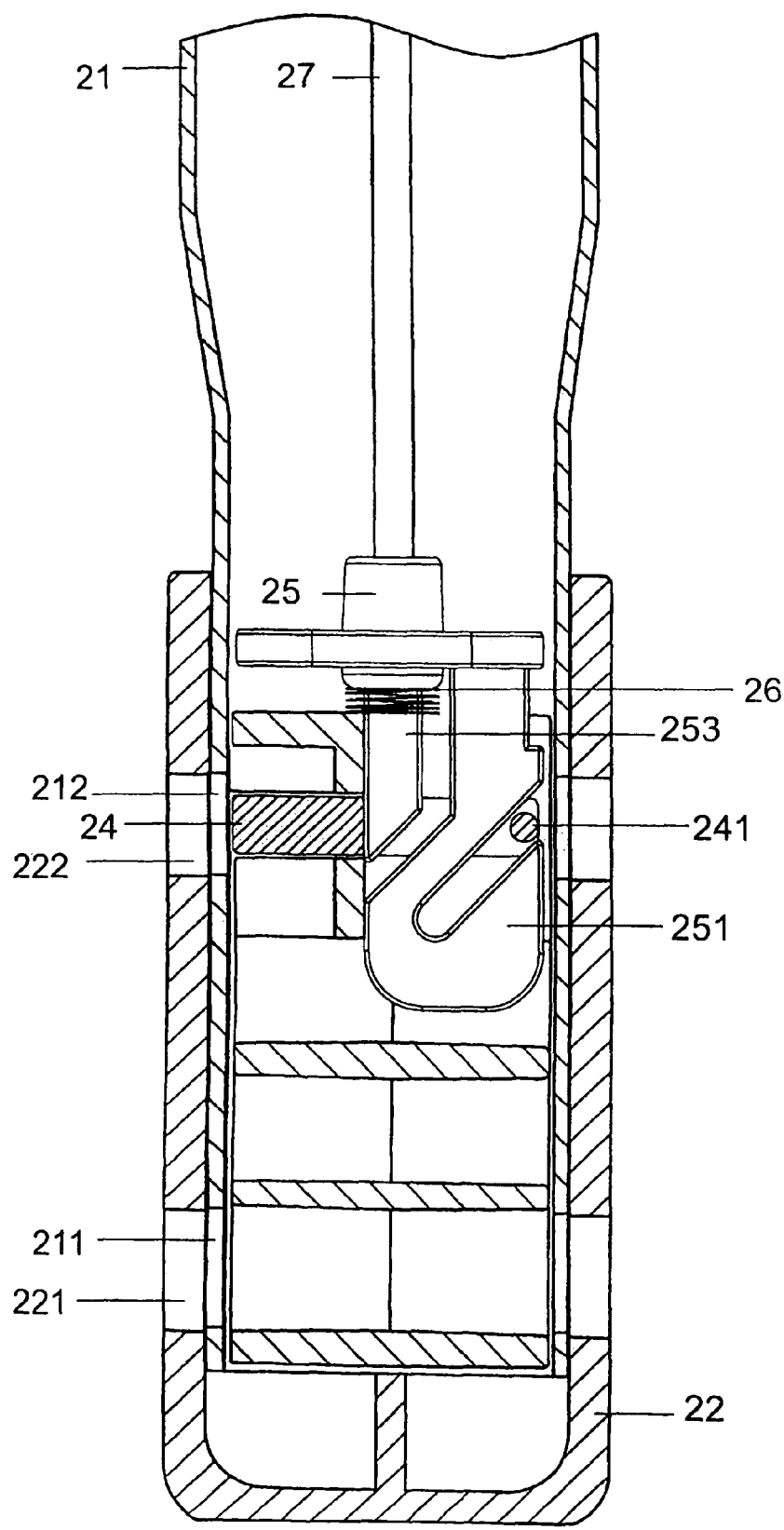
Figure 7:
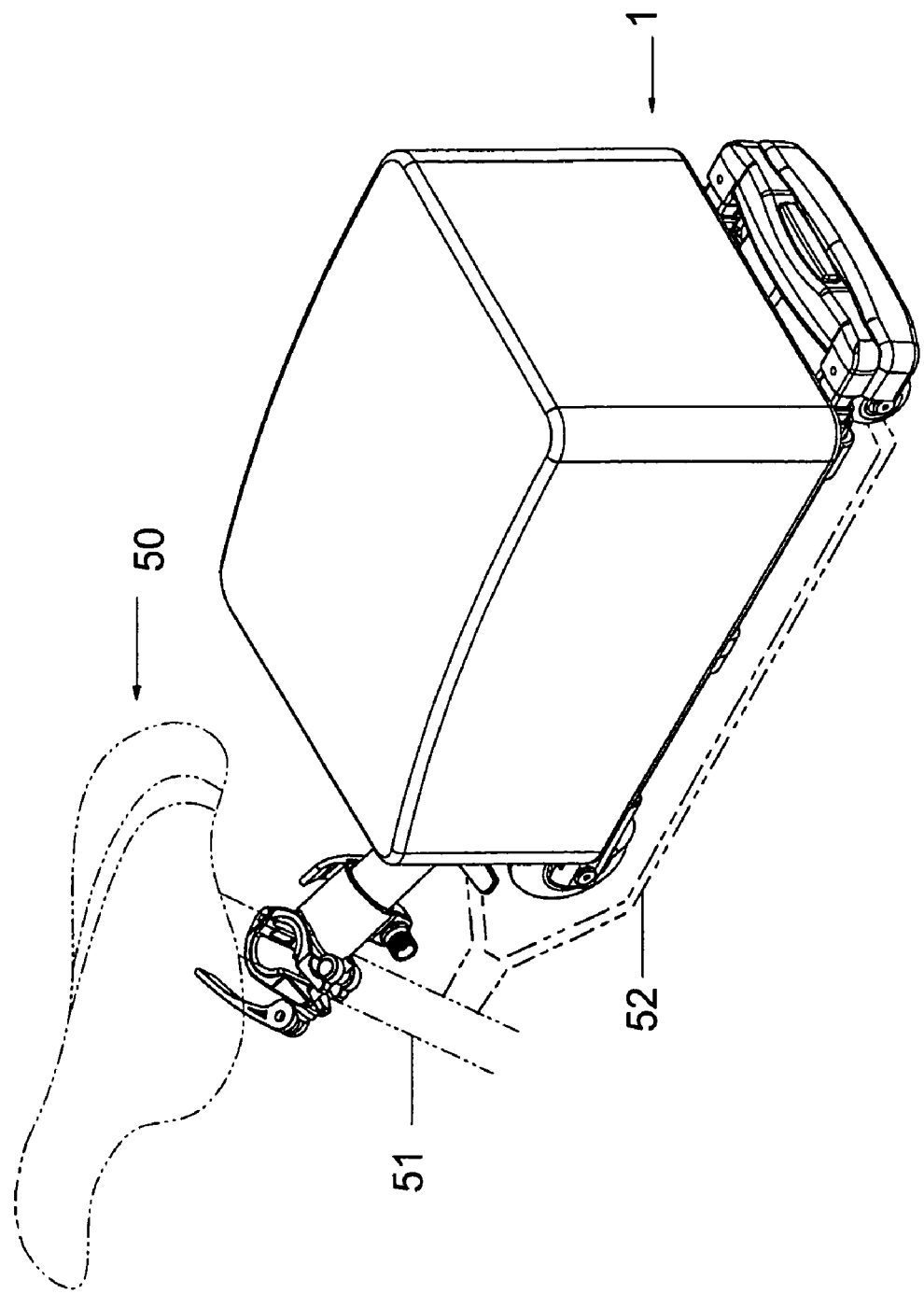
FIG. 7 is an environmental view of the hand truck being disposed on a carrier of a bicycle by releasably securing the fastening device to a seat post of the bicycle.

Referring to FIGS. 1 to 7, a hand truck 1 in accordance with a preferred embodiment of the invention comprises the following components as discussed in detail below.

A pair of telescopic handles 13 are adapted to retract. A rectangular ledge 10 comprises a rear well 11 and a rear cavity 12 open to the rear end. The ledge 10 further comprises two wheels 15 at two rear bottom corners, and an axle 14 interconnecting the wheels 15 by rotatably passing bottom ends of the handles 13 and the cavity 12.

A fastening device 30 comprises a rear quick release 32 adapted to secure to a cylindrical member, and a front mechanical clamp 31.

The locking device 20 comprises a hollow first section 21 having a rear portion being releasably fastened by the clamp 31. The first section 21 comprises a front opening (not numbered), a circular opening 211 on either side adjacent the front opening, and a square opening 212 on either side rearwardly of the circular opening 211.

The locking device 20 further comprises a hollow second section 22 releasably put on a front portion of square cross-section of the first section 21. The second section 22 comprises a rear opening (not numbered), a circular opening 221 on either side adjacent a front blind end, and a square opening 222 on either side rearward of the circular opening 221. The openings 221 and 211 are in registration to each other and the openings 222 and 212 are also in registration to each other when the second section 22 is put on the first section 21. Further, the axle 14 rotatably passes the openings 221, 211.

The locking device 20 further comprises a block member 23 with the axle 14 rotatably passing through to retain it in the first section 21. The block member 23 comprises a transverse channel 231 aligned with the openings 212, 222 and the cavity 12, and a lock pin 24 slidably disposed in the cavity 12, the openings 212, 222, and the channel 231 (i.e., the first and second sections 21, 22 being prevented from pivoting by the lock pin 24 in a position shown in FIG. 5). The lock pin 24 has a short projection 241 at one end in the channel 231.

The locking device 20 further comprises a shuttle member 25 disposed in the first section 21 and comprising a hook 251 partially disposed in the block member 23, an inclined slot 252 in the hook 251 with the projection 241 disposed at a blind end of the slot 252, and a bar 253 besides the hook 251, the bar 253 having an inclined open end retained at a rear end of the block member 23; a helical spring 26 put on the bar 253 to be compressed between the shuttle member 25 and a rear end of the block member 23; and an actuation rod 27 threadedly secured to a rear end of the shuttle member 25 opposite the hook 251 and the bar 253. The actuation rod 27 is retained in the rear portion of the first section 21.

A trunk 40 has a rear lock 41 adapted to lockingly disposed in the well 11.

In an operating position, the fastening device 30 is secured to the locking device 20, i.e., the rear portion of the locking device 20 being fastened by the clamp 31. For retracting the hand truck 1, a user may first detach the clamp 31 from the locking device 20. Next, the user may push the handles 13 downward to decrease its height to a minimum. Next, the user may press the enlarged head of the actuation rod 27 to push the shuttle member 25 with the spring 26 being compressed. At the same time, the bar 253 enters the channel 231 and the hook 251 further moves inside the block member 23. The movement of the hook 251 forces the projection 241 to move toward an open end of the slot 252. Hence, the lock pin 24 moves to completely dispose in the channel 231 by clearing the cavity 12, i.e., both the first and second sections 21, 22 being unlocked. Thereafter, the user may pull the locking device 20 out of the ledge 10. The user can carry the collapsed hand truck 1 by one hand.

Alternatively, after retracting the handles 13 and fastening the locking device 20 at the cavity 12, the user may secure the rear portion of the locking device 20 by means of the clamp 31. Finally, the user may fasten the quick release 32 at a seat post 51 of a bicycle 50 with the hand truck 1 being supported by a carrier 52 of the bicycle 50 (see FIG. 7). This is the subject mode of carrying the hand truck 1.

While the invention herein disclosed has been described by means of specific embodiments, numerous modifications and variations could be made thereto by those skilled in the art without departing from the scope and spirit of the invention set forth in the claims.

What is claimed is:

1. A hand truck comprising:

a pair of telescopic handles (13);

a ledge (10) comprising a rear well (11) and a cavity (12) further behind the well (11) and open to a rear end;

a fastening device (30) comprising a rear quick release (32) and a front fastening element (31);

a locking device (20) comprising a hollow first section (21) including an opening (212) on either side, a hollow second section (22) releasably put on a front portion of the first section (21), the second section (22) including an opening (222) on either side, the openings (222, 212) being in registration to each other, a block member (23) retained in the first section (21) and including a transverse channel (231) aligned with the openings (212, 222) and the cavity (12), a lock pin (24) slidably disposed in the cavity (12), the openings (212, 222), and the channel (231) to lock the first and second sections (21, 22), the lock pin (24) having a projection (241) at one end in the channel (231), a spring depressible shuttle member (25) disposed in the first section (21) and including a hook (251) partially disposed in the block member (23), and an inclined slot (252) in the hook (251) with the projection (241) disposed at a blind end of the slot (252), and an actuation rod (27) releasably secured to the shuttle member (25), the actuation rod (27) being retained in a rear portion of the first section (21);

a trunk (40) including a rear lock (41) adapted to releasably dispose in the well (11); and two wheels (15) at two rear bottom corners of the ledge (10);

wherein in an operating position the first section (21) is secured to the fastening element (31); and wherein after detaching the fastening element (31) from the first section (21), the actuation rod (27) can be pushed to further move the hook (251) into the block member (23) with the projection (241) moving to an open end of the slot (252) to completely dispose the lock pin (24) in the channel (231) so as to unlock both the first and second sections (21, 22).

2. The hand truck of claim 1, wherein the fastening element (31) is a clamp.

3. The hand truck of claim 1, wherein the actuation rod (27) is threadedly secured to the shuttle member (25).

* * * * *